United States Patent [19]

DePalma et al.

[11] Patent Number: 5,750,283
[45] Date of Patent: May 12, 1998

[54] SEAL FOR ELECTROCHEMICAL CELL

[75] Inventors: Christopher L. DePalma, Framingham, Mass.; Lucian P. Fontaine, Lincoln, R.I.; Peter Rick Moses, Winham, N.H.; Marian Wiacek, Holliston, Mass.; Robert A. Yoppolo, Woonsocket, R.I.; Peter Pope, Balcombe, England; Francis Bruce Tubby, Durham, Conn.; Douglas J. Woodnorth, Needham, Mass.

[73] Assignee: Duracell Inc., Bethel, Conn.

[21] Appl. No.: 605,533

[22] Filed: Feb. 22, 1996

Related U.S. Application Data

[63] Continuation of Ser. No. 295,336, Aug. 24, 1994, abandoned.

[51] Int. Cl.$^6$ ........................................ H01M 2/12
[52] U.S. Cl. ........................ 429/56; 429/172; 429/174
[58] Field of Search .............................. 429/56, 53, 54, 429/171, 172, 174, 185

[56] References Cited

U.S. PATENT DOCUMENTS

| | | | |
|---|---|---|---|
| 3,218,197 | 11/1965 | Carmichael et al. | 136/133 |
| 3,219,488 | 11/1965 | Southworth | 136/133 |
| 3,823,039 | 7/1974 | Sanchez | 429/170 |
| 4,075,398 | 2/1978 | Levy | 429/56 |
| 4,122,241 | 10/1978 | Ciliberti, Jr. et al. | 429/172 X |
| 4,191,806 | 3/1980 | Levy | 429/56 |
| 4,237,203 | 12/1980 | Tsuchida et al. | 429/56 X |
| 4,447,507 | 5/1984 | Larranaga | 429/54 |
| 4,476,200 | 10/1984 | Markin et al. | 429/56 |
| 4,537,841 | 8/1985 | Wiacek et al. | 429/56 |
| 4,774,155 | 9/1988 | Nientiedt et al. | 429/56 |
| 5,080,985 | 1/1992 | Wiacek et al. | 429/172 |
| 5,150,602 | 9/1992 | Payne et al. | 298/623.2 |
| 5,227,261 | 7/1993 | Georgopoulus | 429/56 |

*Primary Examiner*—Anthony Skapars
*Attorney, Agent, or Firm*—Barry D. Josephs; Paul I. Douglas

[57] ABSTRACT

An electrochemical cell has a wheel shaped, molded plastic seal member of a unitary construction which includes a central cylindrical hub from which depend in outward radial sequence, an annular pressure vent, a boss, a downward projecting skirt, an annular flexure means for providing radial movement and an outer rim terminating at its periphery in a cylindrical wall. The pressure vent includes a thin membrane ring depending from the hub which joins the hub to an annular diaphragm. A hinge ring joins the periphery of the diaphragm to the boss. The seal member is designed so that the membrane ring fails primarily in shear at excessive cell pressure which makes the vent more reliable and easier to fabricate.

21 Claims, 2 Drawing Sheets

SEAL FOR ELECTROCHEMICAL CELL

This application is a continuation of application Ser. No. 08/295,336, filed Aug. 24, 1994, now abandoned.

BACKGROUND OF THE INVENTION

1. Field of the Invention

This invention relates to a venting seal for an electrochemical cell. More particularly, this invention relates to an electrochemical cell, such as a primary alkaline cell, sealed at one end with a seal containing an electrically nonconductive, plastic seal member having a pressure vent comprising an annular diaphragm that ruptures in shear to vent the cell if excess cell pressure develops.

2. Background of the Disclosure

Electrochemical cells, such as alkaline primary cells, are made by filling a cylindrical metal can or container closed at one end with the active ingredients and then crimping the open end closed over a seal assembly that includes an electrically nonconductive seal member, a metal current collector and a metal end cap which serves as one of the terminals of the cell. Some seal assemblies also include a metal disk which serves as a support to prevent the seal and cover from being crushed or deformed during the crimping step which achieves cell closure. The seal member is generally disk or wheel-shaped and fabricated as a single piece of plastic by injection molding. Illustrative, but non-limiting examples recent developments in such seal assemblies and their use with electrochemical cells are disclosed, for example, in U.S. Pat. Nos. 4,537,841 and 5,080,985.

In addition to its sealing function, the plastic sealing member must also open and vent the cell when the cell pressure exceeds a predetermined level, to avoid decrimping or violent cell rupture under abuse conditions. Practical vent means presently employed in plastic sealing members invariably depend on a membrane of thin plastic to rupture under the high pressure conditions. Various types and configurations of vent means in plastic sealing members are disclosed, for example, in U.S. Pat. Nos. 3,218,197; 3,219,488; 4,476,200, and 5,080,985. The vent means disclosed in these patents fail primarily in tension via a stretching and tearing of the membrane due to an upward movement and ballooning of the vent means under pressure. It is difficult to achieve accurate and reproducible failure in tension with a thin (e.g., 0.2 mm thick) plastic membrane. This can result in the actual vent actuation pressure being variable and difficult to control within desired limits. Accordingly, there is still a need for a vent means in a plastic sealing member which can be accurately molded and which is more reliable and reproducible than a vent which ruptures in tension.

SUMMARY OF THE INVENTION

The present invention relates to an electrically nonconductive seal member for an electrochemical cell and to a cell employing same, wherein said seal member is of a unitary construction and includes a pressure vent that ruptures in pressure induced shear. The seal member is in the shape of a disk or wheel, injection molded as a single unit from a suitable electrically nonconductive and deformable material (e.g., plastic), having a centrally located cylindrical hub joined to an outer rim by a base which contains the pressure vent. The pressure vent comprises an annular diaphragm having a thin membrane as a ring depending from its inner periphery and an annular hinge depending from its outer periphery. The rim includes a cylindrical outer wall portion. In one embodiment the seal member comprises a wheel-shaped disk having a centrally located cylindrical hub from which circumferentially depend, in outward radial sequence, an annular pressure vent, an annular flexure means which permits radial inward movement of the rim without affecting the pressure vent, and a rim having a cylindrical outer wall. In this embodiment the pressure vent comprises a thin membrane as a ring circumferentially depending from the hub and joined to the inner periphery of an annular diaphragm, with a hinge as a ring circumferentially depending from the outer periphery of the diaphragm. The diaphragm is substantially thicker than the membrane and focuses or transfers pressure induced stress to the membrane which enables the membrane to rupture primarily in shear when the cell pressure exceeds a predetermined level. Thus, the diaphragm also acts as a stress inducer to the membrane. Rupture of the membrane releases the inner periphery of the diaphragm, thereby permitting the diaphragm to bend at the hinge and move in a direction away from the applied cell pressure to vent the cell. The seal member is designed to vent the cell when the cell pressure comes within a predetermined value of the decrimping pressure of the cell. The diaphragm portion of the vent is thick enough so as not to balloon or flex under the pressure to such an extent that will cause the membrane to stretch and fail primarily in tension. The hinge portion is thick enough not to rupture and thin enough to flex and thereby permit upward movement of the diaphragm when the inner periphery of the diaphragm is freed by rupture of the membrane.

The plastic seal member of the invention is used in a seal assembly which includes the seal member, a support disk which is pressed against the rim of the seal member for making the seal, an anode current collector, and a metal end cap electrically connected to the collector which acts as the negative terminal of the cell. Thus, the invention relates to an electrochemical cell seal assembly employing the seal member of the invention and also to an electrochemical cell containing the seal member. Employing a membrane which ruptures primarily in shear reduces the vent pressure variability as much as fifty percent and also enables its thickness to be increased, thereby making it easier to mold.

DETAILED DESCRIPTION

Figure 1A:
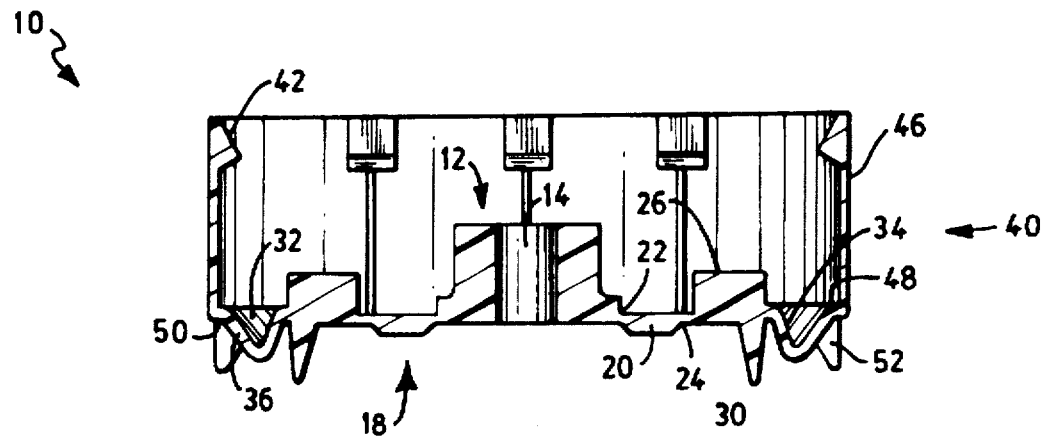
FIGS. 1(a) and 1(b) illustrate a schematic cross-sectional view and a partial perspective view, respectively, of a seal member of the invention.
Figure 1B:
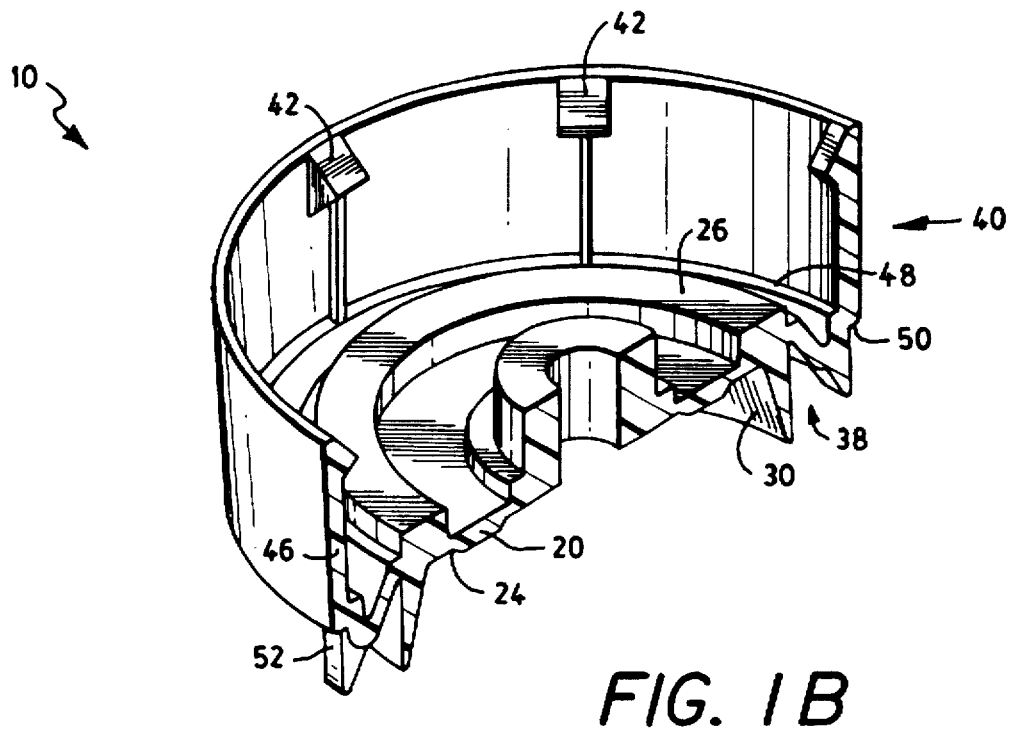
Figure 2:
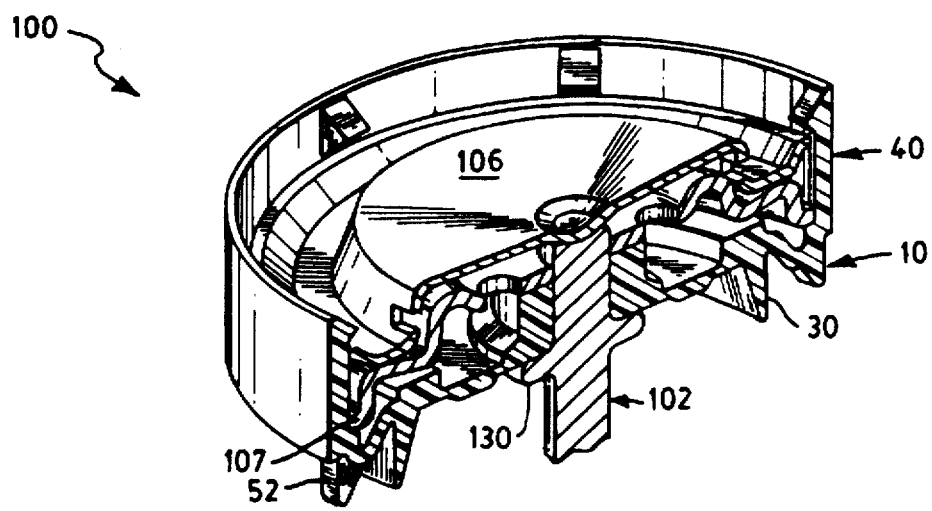
FIG. 2 is a cut-away view, in perspective, of a seal assembly for an electrochemical cell which employs a seal member of the invention.
Figure 3:
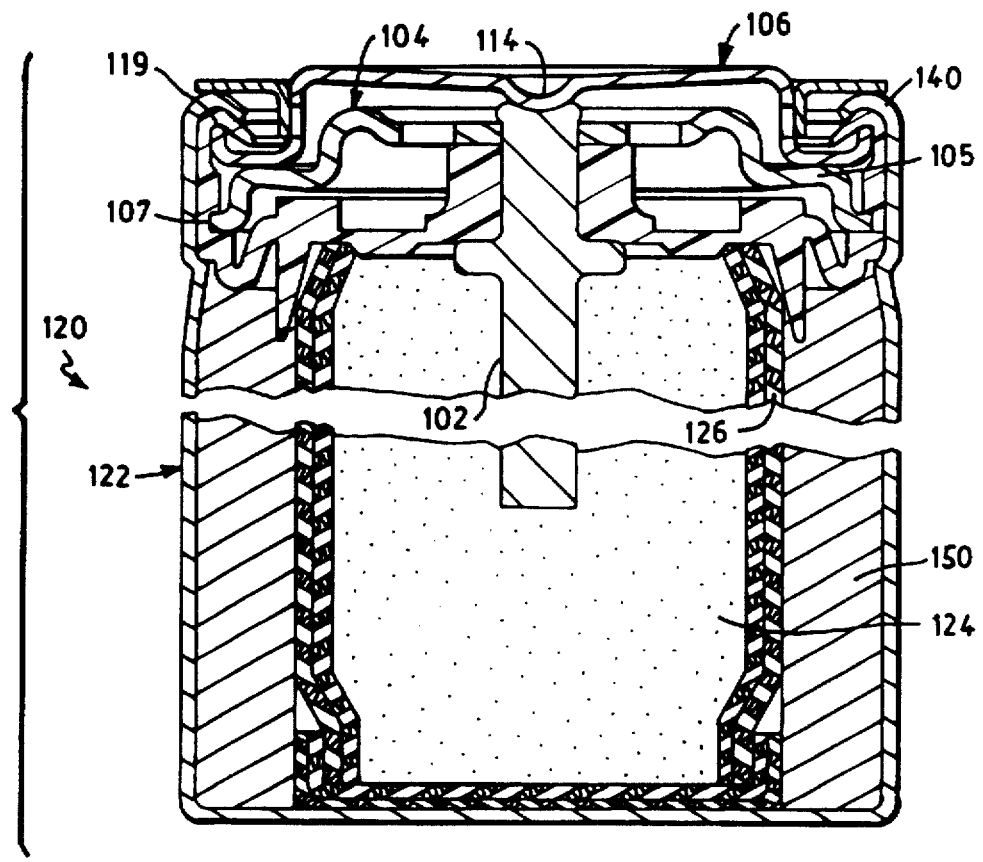
FIG. 3 schematically illustrates a cross section of an alkaline cell having a seal which employs the seal member of the invention.

Referring to FIGS. 1(a) and 1(b), an injection molded plastic seal member 10 is shown as generally wheel or disk-shaped, having a unitary construction, with a centrally located cylindrical hub 12 from which circumferentially depend, in outward radial sequence, an annular pressure vent 18, followed by an annular boss 26, a downwardly projecting skirt 30, an annular flexure means 38 which permits radial movement, and terminating in a rim which includes an upwardly extending cylindrical wall 40 at its outer periphery. In this embodiment, vent 18, boss 26, skirt 30 and flexure means 38 comprise the base portion of the seal member. Pressure vent 18 is the ventable portion of the base and boss 26, skirt 30 and flexure means 38 are the nonventable portion of the base. Hub 12 has an axial bore 14 for receipt of a current collector 102 (FIG. 3) and its longitudinal axis is perpendicular to the plane of the base of the seal member. In this embodiment, annular vent 18 is generally planar and comprises (i) a thin membrane ring 22 at its inner edge by which it depends from and is attached to hub 12, (ii) a relatively thick, annular diaphragm 20 and (iii) a hinge member 24 as a ring around the outer edge of the diaphragm by which the diaphragm is joined to annular boss 26. Boss 26 is illustrated as a relatively thick ring. In this embodiment it cooperates with a metal support as shown in FIGS. 2 and 3 to prevent upward ballooning of the seal member base under cell pressure to an extent which would cause the membrane 22 to fail in tension when the cell is vented, which is explained in detail below. Skirt 30 depends radially outward from the outer portion of boss 26 and extends down to prevent mixing of the anode and cathode components of the cell (e.g., an alkaline cell) as is illustrated in FIG. 3. Flexure means 38 circumferentially depends radially outward from the skirt 30 and includes annular V-shaped channel 32 formed by walls 34 and 36. Finally, upward extending rim 40 depends from the upper portion of wall 36 and contains a plurality of lugs 42 extending radially inward on the interior surface of its thin wall portion 46 for positively securing a metal end cap terminal within as illustrated in FIGS. 2 and 3 and explained in detail below. Circumferential shoulder 48 on the interior surface of rim 40 supports the outer edge of the seal assembly support disk as is illustrated in FIGS. 2 and 3. A plurality of ribs 52 are shown extending radially outward of the exterior surface on the upper portion of wall 36 and downward from the bottom, exterior shoulder 50 of rim 40. These ribs permit the seal assembly to be inserted into the top of the metal can which serves as the positive terminal of the cell (FIG. 3) and at the same time permit entrained air to escape as the seal assembly is placed in the can so as to avoid expulsion or "pumping" of the electrolyte out of the can during assembly. These ribs are dimensioned so as to achieve a slight interference fit with the interior surface of the metal cell container 122 as is illustrated in FIG. 3, so that the seal assembly is held in position in the cell container during assembly and crimping operations. Shoulder 50 on the bottom of rim 40 is shown in FIG. 3 as supporting the seal assembly in the cell and maintaining it at the proper distance from the chemical components of the cell.

As shown in FIGS. 1(a) and 1(b), membrane 22 does not gradually increase in thickness to form the thick diaphragm portion 20 of the vent. Instead there is an abrupt increase in thickness as shown, but with a slight taper 21 for ease of molding. Pressure developed in the cell is exerted against the bottom surface of the base portion of the seal, which includes the diaphragm. The diaphragm portion 20 of the vent is made thick enough so as not to balloon or bow upward in an amount sufficient to result in a tensile stress on the membrane which would cause the membrane to rupture and be pulled away from the outer wall of the hub in a tensile failure at the vent actuation pressure. Thus, the thicker diaphragm transfers the upward induced pressure stress to the membrane which, in the embodiment shown, is in a direction generally parallel to the surface of the substrate from which the membrane depends and perpendicular to the plane of the membrane. In an embodiment which is not illustrated, the bottom of the membrane intersects at an angle generally perpendicular to the vertical, cylindrical outer wall of the hub. At the vent pressure, the diaphragm bows upward under the pressure in an amount sufficient to create a notch stress effect in the membrane at the intersection between the bottom surface of the membrane and the wall of the hub, whereby the membrane ruptures in notch induced shear instead of in tension. In the embodiment illustrated in the Figures which is for a smaller size cell, such as an AA cell, the bottom of the membrane is coincident with the bottom surface of the hub and there is no angle between the bottom surface of the membrane and the outer hub wall. In either case, the membrane 22 fails primarily in shear, thereby permitting diaphragm 20 to bend upward at hinge 24 and vent the cell. Also in the embodiment shown, hinge portion 24 of vent 18 may be of the same thickness and width as membrane 22, or thicker if desired. Its dimensions should be such so as not to shear or balloon upward at the vent actuation pressure, but to flex and bend when shear failure of the membrane 22 occurs to permit the main, thick, diaphragm portion 20 of the vent to move upward and vent the cell. In the embodiment illustrated in the Figures, the membrane and hinge are of the same thickness and width. However, the shear area, being the total circumferential length times the thickness, is much greater for the hinge since its length is substantially longer than that of the membrane. Accordingly, at a given cell pressure, the pressure stress in terms of force per unit area of shear is substantially greater on the membrane than on the hinge.

Those skilled in the art will appreciate that the actual dimensions of the vent member will depend not only on the desired vent pressure, but also on the dimensions of the vent, its location or distance from the center of the plastic seal, the plastic material used for the seal, etc. and that this must be determined on a case-by-case basis. For the sake of illustrating the invention, the following is an illustrative, but non-limiting example of a nylon injection molded seal member of the invention for a D size primary alkaline cell. The disk has an overall O.D. of 33 mm and the overall width of the vent means from the hub to the boss is 3.7 mm. The diaphragm is 0.70 mm thick. The hinge portion is 0.35 mm thick and has a width of 0.27 mm. The membrane is 0.15 mm thick and 0.27 mm wide. The boss is 1.7 mm thick. A similar seal member for a typical AA alkaline cell has an overall O.D. of 14 mm, with the vent being 2 mm wide. The diaphragm is 0.38 mm thick. Both the membrane and hinge portions are 0.19 mm thick and 0.14 mm wide. When used in an AA size cell generally similar to that illustrated in FIG. 3 with the bottom of the membrane coincident with the bottom of the hub, the membrane fails in shear when the cell is vented due to pressure in the cell. Those skilled in the art know that it is difficult to mold plastic without the presence of a fillet at the intersection of adjoining surfaces. Accordingly, the membrane is molded with a fillet at the junction between the upper, lower or both membrane surfaces with the vertical, cylindrical wall surface of the hub. The radius of the fillet or fillets (not shown) is as small as possible and does not exceed about 0.05 mm.

Illustrative, but non-limiting examples of commercially available materials suitable for use in fabricating the seal means of the invention include thermoplastic polymers such as nylon, filled polypropylene, ploysulfone and alloys of various nylons and other materials as olefinic polymers, ABS and polysulfone.

FIG. 2 is a cut-away view, in perspective, of a cell seal assembly employing a seal of the invention, which in this embodiment is for an alkaline AA cell. FIG. 3 schematically illustrates a cross section of an AA cell, one end of which is sealed with the said seal assembly by crimping. FIG. 2 illustrates a preferred embodiment in which the seal assembly 100, including the seal 10 of the invention, is preassembled as an integrated part which can be handled as a single element during cell assembly. Referring to FIGS. 2 and 3, seal assembly 100 is shown as including a molded plastic seal member 10 of the invention, a metal current collector 102, a metal support member 104, and a metal cap 106 which also functions as one of the electrical terminals of the cell. In this embodiment, cap 106 is the negative terminal of the alkaline primary cell. Metal current collectors are commonly referred to by those skilled in the art as nails and such types of current collectors may be used in the practice of the invention if desired. In the embodiment illustrated and described herein, the metal current collector is more like a rivet than a nail. Annular boss 26 of the plastic seal member cooperates with the metal support 104 to prevent ballooning of the base of the seal member under cell pressure, by the upper surface of the boss contacting the lower surface of an annular ring portion 105 (FIG. 3) of support disk 104. This limits upward movement of the boss and hence also limits upward movement of the base of seal member 10, thereby preventing excessive ballooning under pressure which could otherwise cause the membrane to fail in tension rather than shear. Skirt 30 depends from the outer portion of boss 26 and extends downwardly to prevent mixing of the anode and cathode components of the cell (e.g., an alkaline primary cell) as is illustrated in FIG. 3. The plurality of lugs 42 extending radially inward from the interior surface of rim 40 positively secure metal cap 106 within, so that the seal assembly can be handled as a single integrated unit during assembly of the cell. During assembly, cap 106 is placed on top of the lugs and pressed or snapped past the lugs and down into the cavity defined by the wall 40 of the seal member and the top of metal support disk 104. Circumferential shoulder 48 on the interior surface of rim 40 supports the edge of disk 104 during crimping when the seal is formed. A plurality of ribs 52 are shown extending radially outward of the exterior surface on the upper portion of wall 40 and downward from the bottom, exterior shoulder 50 of rim 40. These ribs permit the seal assembly to be inserted into the top of the metal can which serves as the positive cell terminal, while at the same time permitting entrained air to escape as the seal assembly is placed in the can to avoid "pumping" of the electrolyte out of the can during assembly. These ribs are dimensioned so as to achieve a slight interference fit with the corresponding internal wall surface of metal cell container 122 as illustrated in FIG. 3, so that the seal assembly is held in position in the cell container during assembly and crimping operations. While this seal assembly is a preferred embodiment employing a seal member 10 of the invention, those skilled in the art will appreciate that other designs incorporating the seal member of the invention may be employed for the seal assembly, illustrative, but non-limiting examples of which include those types described in the '985 and '602 patents.

When the seal is formed by crimping, radial edge 107 of support 104 bites into the interior portion of rim wall 46 of the seal member 10 as shown in FIG. 3. It is preferred that the edge 107 of the support compress the wall 46 of the seal member in an amount of at least 25% of the thickness of wall 46 in order to achieve a good seal. Further, metal support 104 is designed as illustrated so that the edge 107 exhibits a spring-like resiliency and maintains a radially outward compressive force on wall 46 to assure that the seal is maintained over a wide temperature range (e.g., about −30° to +80° C.) during the life of the cell. Also, it will be appreciated that flexure means 38 permits the rim of the seal member to move radially inward and outward during assembly and crimping operations, and also during temperature fluctuations, without affecting the rest of the base of the seal, including the pressure vent.

Shoulder 50 on the bottom of rim 40 is shown in FIG. 3 as supporting the seal assembly in the cell 120 by resting on the interior circumferential shoulder 124 crimped into the metal can 122 which forms the container of the cell. Metal end cap 106 which is the negative terminal of cell 120 is illustrated in this embodiment as a metal disk having a planar central disk portion 112 which slopes slightly downward towards its center at which is centrally located a downwardly protruding dimple 114. A relatively shallow cylindrical portion 116 depends downward from the outer periphery of 112, with a flange 117 depending from the bottom of 116, extending radially outward and terminating at its outer periphery in an upward extending rim 118 having a circumferential outer edge 119. As with the seal means described above, this particular end cap construction is a preferred embodiment which is not intended to be limiting with respect to the practice of the invention. Thus other end cap designs may be employed such as that illustrated in the '985 patent.

Seal assembly 100 is shown as crimp sealed into the upper end of cell 120 by a permanent bend 140 circumferentially formed in the upper end of the metal cell wall. The crimp forces the cell wall against the outer surface of rim 40 of plastic seal member 10 and bends them both together down and over the edge 119 of metal cap 106 to seal the cell. At the same time an inward radial force is circumferentially applied to the outer edge 107 of support 104 during the crimping operation which, due to the design of the support, results in a permanent upward force applied to the central portion of the support, helping to insure physical and electrical contact between the upper end of the anode current collector 102 and the dimple 114 in the end cap 100. Metal anode current collector or nail 102 is shown with the top of its upper portion peened open to rivet metal support 104 firmly in place against the top of hub 12, being prevented from upward movement by a flange 130. The planar upper portion of the end cap 106 is shown in FIG. 3 as being dished downwards towards the center for the sake of illustrating the construction of the cap prior to crimping. However, during the crimping and sealing operation, a radial inward force is applied to the side of the seal assembly which, in this preferred embodiment, results in the assembly being permanently compressed inward. This in turn causes the upper portion of the support to be deflected slightly upward, with the upper end of the current collector permanently pushing the dimple up so that the upper planar portion of end cap terminal 106 is permanently flat. This also results in a permanent upward force by the upper end of the current collector on the dimple which assures a permanent mechanical and concomitant electrical connection between the metal current collector and end cap during the life of the cell.

Cell 120 in FIG. 3 is meant to be representative of a typical alkaline primary cell having a gelled zinc anode and a $MnO_2$ cathode. As is known to those skilled in the art, inside cell 120, an $MnO_2$ cathodic material 150 is in contact with the interior surface of metal can 122 and is separated from a gelled zinc anode material 124 by means of electrically nonconductive membrane 126 which also prevents the anodic material from contacting the bottom of the can. Skirt 30 of plastic seal member 10 overlaps the separator and prevents the anodic and cathodic materials from mixing in the cell. Current collector 102 extends into the anodic material as shown in FIG. 3 and thereby makes an electrical connection between the gelled zinc anode and the metal end cap terminal.

It is understood that various other embodiments and modifications in the practice of the invention will be apparent to, and can readily made by, those skilled in the art without departing from the scope and spirit of the invention disclosed above. Accordingly, it is not intended that the scope of the claims appended hereto be limited to the description set forth above, but rather that the claims be construed as encompassing all of the features of patentable novelty which reside in the present invention, including all features and embodiments which would be treated as equivalents thereof by those skilled in the art to which the invention pertains.

What is claimed is:

1. An electrically nonconductive, disk shaped seal member for an electrochemical cell including a centrally located, cylindrical hub joined to an outer rim by a base which includes in outward radial sequesnce an annular pressure vent and a raised annular boss having an inner wall and an outer wall, said vent comprising an annular diaphragm having a thin membrane ring along its inner periphery and said thin membrane ring located adjacent to and circumventing said hub, said thin membrane ring rupturable in pressure induced shear along its entire inner periphery, said annular diaphragm having an annular hinge at its outer periphery, said annular hinge being integrally attached to the inner wall of said raised annular boss, said annular hinge designed to flex when said thin membrane ring ruptures in pressure induced shear.

2. A seal member of claim 1 in which said pressure vent circumferentially depends from said cylindrical hub by said membrane.

3. A seal member of claim 2 wherein said diaphragm is thicker than said membrane.

4. An electrically nonconductive seal member for an electrochemical cell, said seal member being of a unitary construction, wheel shaped and comprising a centrally located cylindrical hub joined to an outer rim by a base which circumferentially depends from said hub, with said base comprising an annular pressure vent, a raised annular boss having an inner wall and an outer wall, a downward projecting skirt, a flexure means for providing radial flexure, and wherein said vent comprises an annular diaphragm depending from said hub, said annular diaphragm having a thin membrane ring along its inner periphery, said thin membrane ring being located adjacent to and circumventing said hub, and said diaphragm further comprising a hinge at the outer periphery of said diaphragm integrally joining said diaphragm to the inner wall of said raised annular boss, and wherein said diaphragm ruptures in shear along the periphery of said thin membrane ring to vent said cell under excessive cell pressure.

5. A seal member of claim 4 wherein said rim terminates at its outer periphery in a cylindrical wall.

6. A seal member of claim 5 wherein said pressure vent, boss, skirt, flexure means and rim, respectively, circumferentially depend from said boss in outward radial sequence.

7. A seal according to claim 6 wherein the longitudinal axes of said hub and wall are perpendicular to the plane of said seal member.

8. A seal assembly for sealing an electrochemical cell comprising a plastic sealing member, a support disk attached to said member by a metal current collector which extends axially through the center of said disk and said member, and a circular metal end cap terminal disposed adjacent said support, said sealing member being wheel shaped and of a unitary construction having a central axis coincident with the longitudinal axis of said cell and containing an annular pressure vent for venting said cell during pressure buildup in the cell, said seal member including a centrally located cylindrical hub from which circumferentially depend in outward radial sequence, a pressure vent, a raised annular boss having an inner wall and an outer wall, a downward projecting skirt, and an outer rim, said sealing member terminating at its periphery in a cylindrical wall and said vent including an annular diaphragm depending from said hub, said annular diaphragm having a thin membrane ring along its inner periphery, said thin membrane ring being located adjacent to and circumventing said hub, and said diaphragm further comprising a hinge at the outer periphery of said diaphragm integrally joining said diaphragm to the inner wall of said raised annular boss, and wherein said diaphragm ruptures in shear along the periphery of said thin membrane ring under excessive cell pressure to vent said cell.

9. A seal assembly according to claim 8 wherein said seal member includes an annular flexure means which can move radially inward and outward for making a seal against said rim wall.

10. A seal assembly according to claim 9 wherein said metal end cap is dished downward towards its center.

11. A seal assembly according to claim 10 wherein the longitudinal axis of said hub and wall are parallel to the longitudinal axis of said cell.

12. A seal assembly according to claim 11 wherein said seal member includes a flexure means joining said boss to said rim.

13. A seal assembly according to claim 8 wherein said boss cooperates with said support to insure that said membrane ruptures in shear.

14. An electrochemical cell comprising a cylindrical metal container crimp sealed at one end with a seal assembly comprising a plastic sealing member, a support disk having a sealing edge disposed adjacent to said sealing member and a current collector, said sealing member being wheel shaped and of a unitary construction having a central axis coincident with the longitudinal axis of said cell and comprising a centrally located, cylindrical hub joined to an outer rim having a cylindrical wall by a base which includes in outward radial sequence an annular pressure vent and a raised annular boss having an inner wall and an outer wall, said vent comprising an annular diaphragm depending from said hub, said annular diaphragm having a thin membrane ring along its inner periphery, said thin membrane ring being located adjacent to and circumventing said hub, wherein said thin membrane ring is rupturable in pressure induced shear, and said diaphragm further comprising a hinge at the outer periphery of said diaphragm integrally joining said diaphragm to the inner wall of said raised annular boss, and wherein said edge of said support compresses said wall of said sealing member rim against the wall of said metal container to form a seal.

15. A cell according to claim 14 wherein said sealing member and said support cooperate to prevent said sealing member from ballooning under cell pressure.

16. A cell according to claim 15 wherein said sealing member base includes an annular boss which cooperates with said support to prevent said ballooning.

17. A cell according to claim 16 wherein said sealing member base also includes an annular flexure means for providing radial movement.

18. A cell acccording to claim 17 wherein said seal assembly contains a circular end terminal disposed adjacent said support.

19. A cell according to claim 18 wherein said current collector attaches said support to said sealing member.

20. A cell according to claim 19 wherein said collector makes physical and electrical contact with said end terminal.

21. A cell according to claim 20 wherein said sealing member is made of nylon.

* * * * *

UNITED STATES PATENT AND TRADEMARK OFFICE
CERTIFICATE OF CORRECTION

PATENT NO. : 5,750,283
DATED : May 12, 1998
INVENTOR(S) : DePalma et al.

It is certified that error appears in the above-indentified patent and that said Letters Patent is hereby corrected as shown below:

<u>Title Page of Patent, under heading "Inventors," Line 2, change "Lucian P. Fontaine" to --Lucien P. Fontaine--.</u>

Signed and Sealed this

Eighteenth Day of August, 1998

*Attest:*

BRUCE LEHMAN

*Attesting Officer*     *Commissioner of Patents and Trademarks*